United States Patent [19]
Okubo

[11] Patent Number: 6,081,673
[45] Date of Patent: Jun. 27, 2000

[54] CAMERA CONTROL CIRCUIT

[75] Inventor: Mitsumasa Okubo, Hino, Japan

[73] Assignee: Olympus Optical Co., Ltd., Tokyo, Japan

[21] Appl. No.: 09/248,644

[22] Filed: Feb. 11, 1999

[30] Foreign Application Priority Data

Feb. 16, 1998 [JP] Japan ................................. 10-032966

[51] Int. Cl.$^7$ ................................................ G03B 7/26
[52] U.S. Cl. ........................................ 396/205; 396/301
[58] Field of Search .................................. 396/205, 206, 396/301, 303, 106

[56] References Cited

U.S. PATENT DOCUMENTS

| | | | |
|---|---|---|---|
| 5,365,305 | 11/1994 | Seki et al. | 396/301 |
| 5,389,998 | 2/1995 | Dunsmore et al. | 396/301 |
| 5,640,624 | 6/1997 | Lee | 396/205 |
| 5,809,315 | 11/1994 | Ohtsuka | 396/206 |
| 5,832,324 | 11/1998 | Shimizu et al. | 396/106 |

FOREIGN PATENT DOCUMENTS 7-302690A  11/1995  Japan .

Primary Examiner—Russell Adams
Attorney, Agent, or Firm—Frishauf, Holtz, Goodman, Langer & Chick, P.C.

[57] ABSTRACT

A camera control circuit is provided which is capable of carrying out a control operation under a required high voltage even in the case of using a low withstand voltage circuit element which is capable of operating at a high speed and a low power consumption. A CPU comprises of an I/O section which is capable of operating in a predetermined supply voltage range and a core section which is capable of operating in a predetermined supply voltage range having an upper limit value lower than the I/O section, and outputs a control instruction so as to control peripheral circuits. On the basis of the control instruction, a voltage-up circuit increases a supply voltage of a battery in a supply voltage range enabling the I/O section to operate so as to set as a first supply voltage, and then, supplies the first supply voltage to the I/O section. On the other hand, a regulator included in an interface IC decreases the first supply voltage for a predetermined period in a supply voltage range enabling the core section to operate so as to set as a second supply voltage, and then, supplies the second supply voltage to the core section.

19 Claims, 4 Drawing Sheets

CAMERA CONTROL CIRCUIT

BACKGROUND OF THE INVENTION

The present invention relates to a camera control circuit, and more particularly, to a camera control circuit which includes a computation control circuit having a high density and low voltage core.

In recent years, a camera which includes a low voltage core control circuit having a low voltage core has been developed. For example, in Japanese Patent Application Kokai No. 7-302690 which is a prior application filed by the applicant of this application, there has been disclosed a camera in which a high voltage prepared by increasing a battery voltage is applied to a line terminal of a CPU included in the camera, and then, a strobe gate drive type switching element is driven by a port of the CPU.

As described above, a supply voltage of the CPU of a single power source is increased in accordance with the necessity for control, and in that state, the CPU carries out necessary controls, and thereby, each section can be controlled under a high voltage in accordance with the necessity. Thus, it is possible to obtain a camera control circuit which is driven at a low power consumption and has a small size at a low cost.

The camera disclosed in Japanese Patent Application Kokai No. 7-302690 is required to use a CPU capable of withstanding the high voltage. This, however, results in cost increases.

On the other hand, in recent years, in order to operate an IC such as a CPU at a high speed and low power consumption, the IC pattern has been made further fine. However, when the pattern is further made fine, a withstand voltage of the IC pattern lowers. For this reason, there is a problem that it is impossible to apply a high voltage to the CPU.

BRIEF SUMMARY OF THE INVENTION

Therefore, an object of the present invention is to provide a camera control circuit which can perform a control operation under a required high voltage even in the case of using a low withstand voltage circuit element capable of operating at a high speed and low power consumption.

A first object of the present invention is to provide a camera control circuit comprising:

a control circuit including a first function block capable of operating in a predetermined supply voltage range and a second function block capable of operating in a predetermined supply voltage range having an upper limit value lower than the first function block, and outputting a control instruction so as to control peripheral circuits;

a voltage-up circuit increasing a supply voltage of a battery in a supply voltage range enabling the first function block to operate so as to set as a first supply voltage on the basis of the control instruction, and supplying the first supply voltage to the first function block; and a voltage-down circuit decreasing the first supply voltage in a supply voltage range enabling the second function block to operate so as to set as a second supply voltage on the basis of the control instruction, and supplying the second supply voltage to the second function block.

A second object of the present invention is to provide a camera control circuit comprising:

a control circuit including a first function block capable of operating in a predetermined supply voltage range and a second function block capable of operating in a predetermined supply voltage range having an upper limit value lower than the first function block, and outputting a control instruction so as to control peripheral circuits;

a voltage-up circuit increasing a supply voltage of a battery in a supply voltage range enabling the first function block to operate so as to set as a first supply voltage on the basis of the control instruction, and supplying the first supply voltage to the first function block; and a voltage-down circuit decreasing the first supply voltage in a supply voltage range enabling the second function block to operate so as to set as a second supply voltage regardless of the control instruction, and supplying the second supply voltage to the second function block.

A third object of the present invention is to provide a camera control circuit comprising:

a control circuit having a one-chip microcomputer including a first function block capable of operating in a predetermined supply voltage range and a second function block capable of operating in a predetermined supply voltage range having an upper limit value lower than the first function block, and outputting a control instruction so as to control peripheral circuits;

a voltage-up circuit increasing a supply voltage of a battery in a supply voltage range enabling the first function block to operate so as to set as a first supply voltage on the basis of the control instruction, and supplying the first supply voltage to the first function block; and a voltage-down circuit decreasing the first supply voltage in a supply voltage range enabling the second function block to operate so as to set as a second supply voltage on the basis of the control instruction, and supplying the second supply voltage to the second function block.

A fourth object of the present invention is to provide a camera control circuit comprising:

a control circuit having a one-chip microcomputer including an input/output section which is capable of operating in a predetermined supply voltage range and carries out an electric signal exchange with peripheral circuits, and including a computation control section which is capable of operating in a predetermined supply voltage range having an upper limit value lower than the input/output section, and outputting a control instruction so as to control peripheral circuits;

a voltage-up circuit increasing a supply voltage of a battery in a supply voltage range enabling the input/output section to operate so as to set as a first supply voltage on the basis of the control instruction, and supplying the first supply voltage to the input/output section;

a voltage-down circuit decreasing the first supply voltage in a supply voltage range enabling the computer control section to operate so as to set as a second supply voltage on the basis of the control instruction, and supplying the second supply voltage to the computer control section;

a strobe circuit having a gate drive type switching element which is directly driven and controlled by the control circuit, and carrying out a strobe charge operation and a strobe flashing operation; and a distance measurement circuit having a distance measurement element which is directly driven and controlled by the control circuit, wherein the control circuit controls the voltage-up circuit and the voltage-down circuit at least at a time of the strobe operation by the strobe circuit or at a time of the distance measurement operation by the distance measurement circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of a camera control circuit according to the present invention will be described below with reference to the accompanying drawings.

Figure 1:
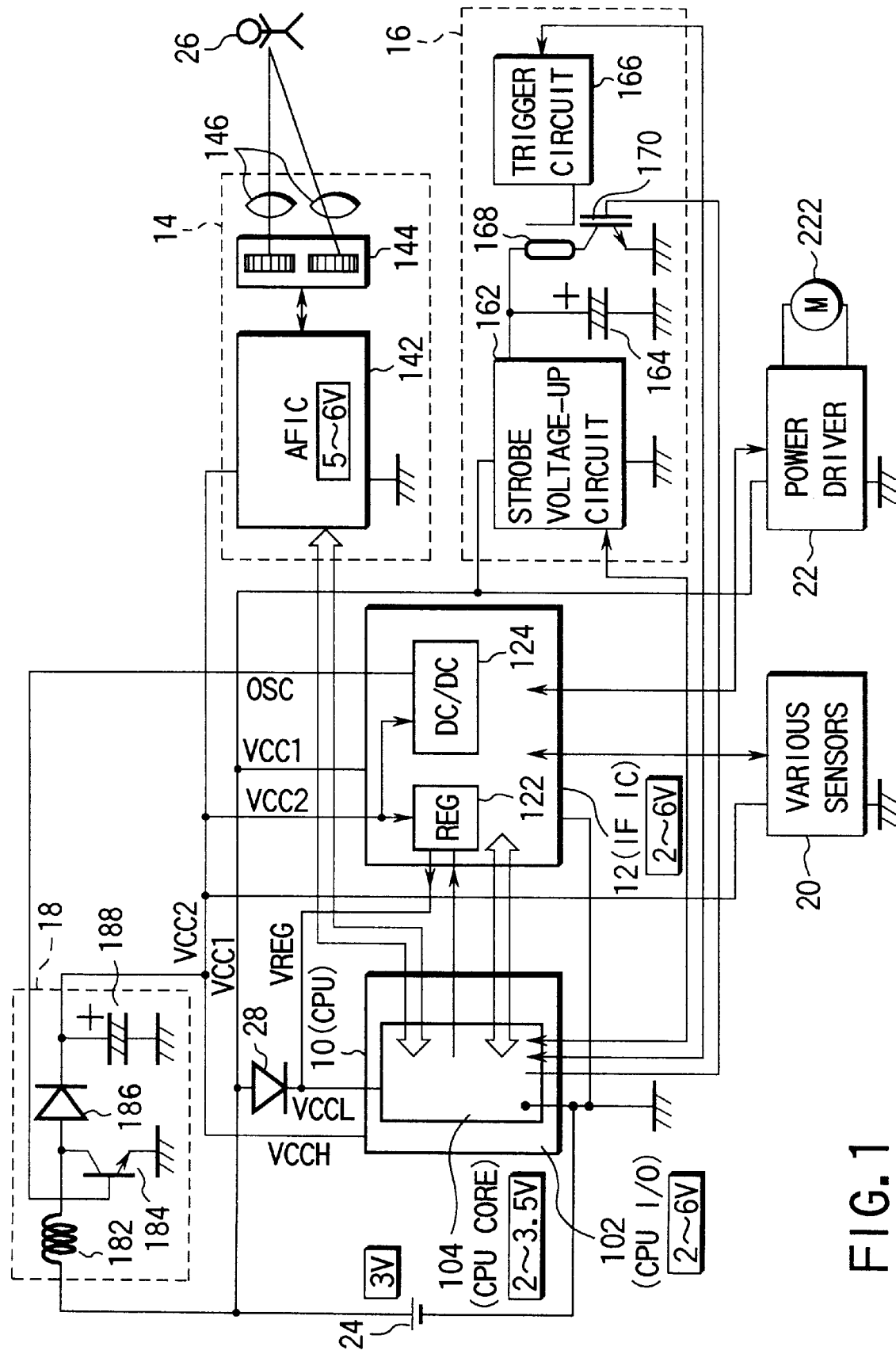
FIG. 1 is a diagram showing a construction of a camera control circuit according to a first embodiment of the present invention.

FIG. 1 is a diagram showing a construction of a camera control circuit according to a first embodiment of the present invention.

In FIG. 1, a CPU 10 controls the whole of camera, and comprises a one-chip microcomputer. The CPU 10 comprises an I/O section 102 and a CPU core section 104. The I/O section 102 carries out an electric signal exchange with an external section of the CPU 10 when an operating supply voltage is, for example, 2 to 6V. Further, the CPU core section 104 is high integration, and is operated when an operating supply voltage is, for example, 2 to 3.5V.

Moreover, a level shifter is interposed between the I/O section 102 and the core section 104 so that a logical signal can be transmitted even if a different supply voltage is applied to the respective blocks. Supply terminals of the I/O section 102 and the core section 104 are respectively VCCH and VCCL.

The CPU 10 is connected with an interface IC 12, a distance measurement section 14, a strobe circuit 16, a voltage-up circuit 18, various sensors 20, a power driver 22 and a battery 24, which details are described below.

The interface IC 12 comprises an analog circuit. The interface IC 12 comprises a regulator 122 and a DC/DC converter control circuit 124. Further, the interface IC 12 is constructed in a manner that an operating state is set on the basis of an instruction from the CPU 10.

The regulator 122 decreases a voltage of VCC2, for example, outputs a 3.3V constant voltage to a VREG terminal. The DC/DC converter control circuit 124 increases the VCC1 which is an output power source of the battery 24, and thereby, the power source VCC2 can be kept so as to become a voltage of, for example, 3.5V or 5V.

The distance measurement section 14 is distance measurement means for detecting a distance up to a subject. The distance measurement section 14 comprises a line sensor array 144 which photoelectrically converts a ray from an external subject 26, an imaging lens 146 which guides the ray from the subject 26 on the line sensor array 144 so as to make an image formation, and an AFIC 142 which is controlled by the CPU 10 so as to process a signal output from the line sensor array 144 and to output the signal to the CPU 10. Also, since the line sensor array 144 must be driven at a relatively high voltage of about 5V, in the case of carrying out a focusing operation, the supply voltage VCC2 needs to be increased to 5V.

The strobe circuit 16 comprises of a strobe voltage-up circuit 162, a main capacitor 164, a trigger circuit 166, a xenon tube 168 and a gate drive switching element (IGBT element) 170. The strobe voltage-up circuit 162 stores a charge into the main capacitor 164 on the basis of the control of CPU 10. The trigger circuit 166 applies a high voltage for a flashing start to the xenon tube 168. The IGBT element 170 is directly driven by a port of the CPU 10, and can stop a flash of the xenon flash tube 168 in the middle of flashing.

The voltage-up circuit 18 comprises a coil 182, an NPN type power transistor 184 which has a base controlled by an output OSC of the DC/DC converter control circuit 124 included in the interface IC 12, a rectifying schottky barrier diode 186 and a capacitor 188.

The various sensors 20 comprise a photo interrupter, a photo reflector, various sensors such as a photometry element, which are not shown. These various sensors 20 are controlled by the interface IC 12, and their outputs are processed by the interface IC 12, and then, is sent to the CPU 10.

The power driver 22 is controlled by the interface IC 12 on the basis of an instruction from the CPU 10, and drives a motor 222 and a power element (not shown) which is representative of an actuator such as a plunger.

The battery 24 has a 3V release voltage, and is connected to the CPU 10 via a schottky barrier diode 28. In the case where the regulator 122 is stopped by the schottky barrier diode 28 and a VREG terminal becomes high impedance, a supply is supplied from the VCC1 side.

Next, a control operation of the supply voltage in the first embodiment will be described below with reference to a timing chart shown in FIG. 2.

Figure 2:
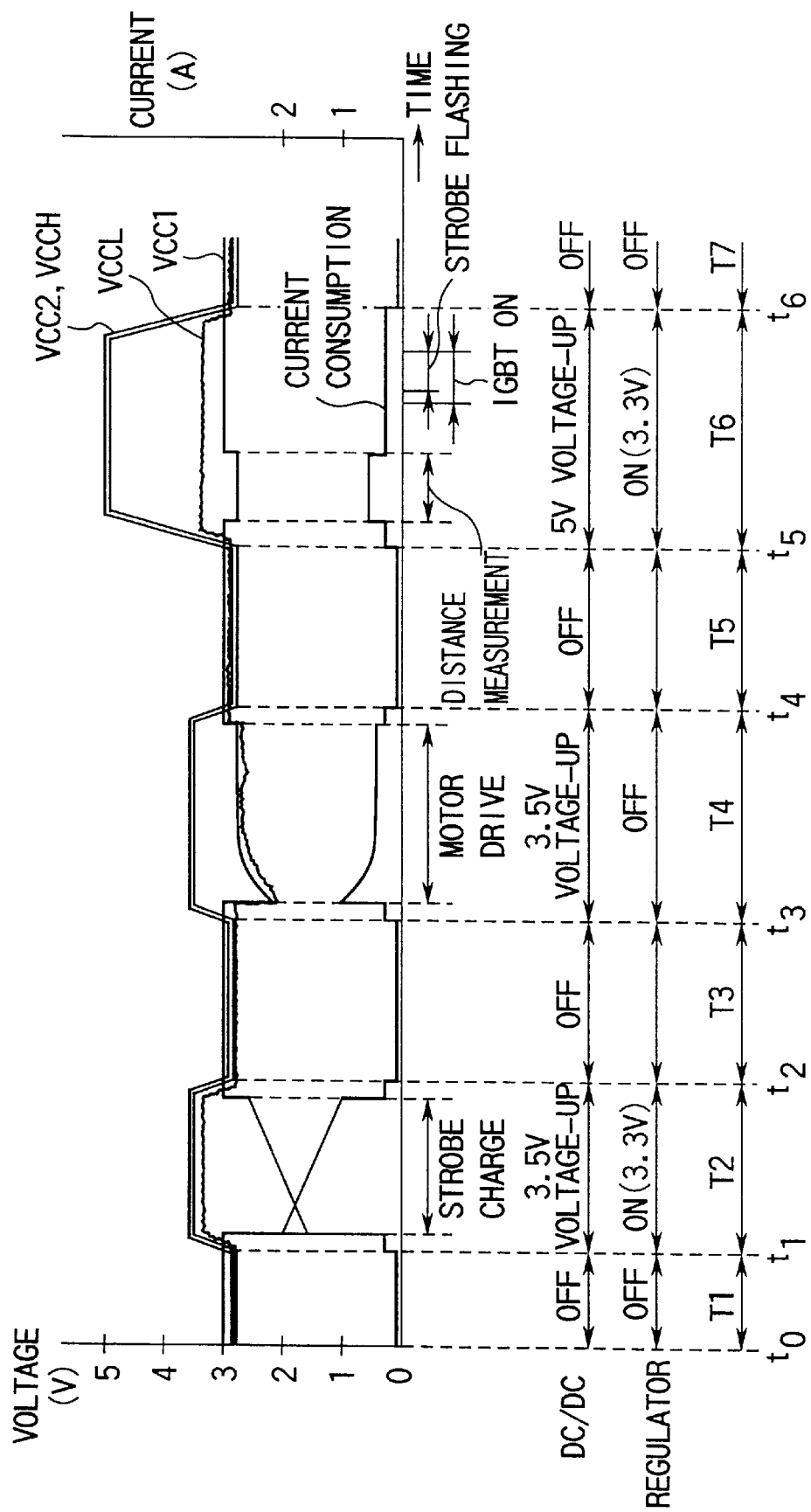
FIG. 2 is a timing chart showing a change in a supply voltage and a current consumption of the camera in the first embodiment.

FIG. 2 is a timing chart showing a change in a supply voltage and a current consumption of the camera in the first embodiment.

At first, a period T1 from time to $t_0$ $t_1$ shows a waiting state immediately after the battery 24 is mounted to the camera, or immediately after a power source switch (not shown) is turned on. At this time, a current consumption is only a current flowing through control circuits such as CPU 10 and interface IC 12, and the DC/DC converter control circuit 124 is stopped. For this reason, a very slightly current consumption of about several mA merely flows thereto.

Moreover, since a current supplied from the battery 24 is slight, no voltage drop is caused by an internal resistance of the battery 24, and the VCC1 (=VCCH) becomes 3V substantially same as a release voltage of the battery 24. On the other hand, the VCC2 becomes about 2.8V subtracting a voltage drop by the schottky barrier diode 186 from the VCC1. Further, the VCCL becomes about 2.8V subtracting a voltage drop by the schottky barrier diode 28 from the VCC1 since the regulator 122 is not operated.

Following the above period T1, a period T2 from time $t_1$ to time $t_2$ shows a state at a time of a strobe charge. In the strobe charge, at first, the CPU 10 gives the interface IC 12 instruction to increase the DC/DC converter control circuit 124 to 3.5V, and then, the VCC2 is kept to 3.5V. Subsequently, the CPU 10 gives the interface IC 12 instruction to operate the regulator 122. Whereby the VCCL is kept to 3.3V.

Next, the CPU 10 gives a strobe charge instruction to the strobe voltage-up circuit 162. Since a strobe charger requires a high current, the VCC1 is decreased to, for example, about 1.5V by the internal resistance of the battery 24. Also, a current value is increased to tens of mA at the point of time when the DC/DC converter control circuit 124 starts a 3.5V voltage-up operation, and then, the strobe charge operation is started, and thereby, a high current of about 2A is obtained.

A period T3 from time $t_2$ to time $t_3$ shows a waiting state after the strobe charge operation is completed, and becomes substantially same as the period T1.

Following the above period T3, a period T4 from time $t_3$ to time $t_4$ shows a state at a time of a motor driving.

In the period T4, at first, the CPU 10 gives the interface IC 12 instruction to increase the DC/DC converter control circuit 124 to 3.5V, and then, the VCC2 is kept to 3.5V. Next, the CPU 10 gives the interface IC 12 an instruction to drive the motor 222, and then, the motor 222 is driven.

In this embodiment, since a motor having a relatively high resistance value is used, the current consumption is less than that in the strobe charge operation, and the VCC1 is kept more than 2V. Thus, the regulator 122 is in no operation state, and therefore, a voltage subtracted a voltage drop by the schottky barrier diode 28 from VCC1 is supplied to the VCCL. Also, a current value becomes about 1A in a start-up time.

A period T5 from time $t_4$ to time $t_5$ shows a waiting state after the motor driving operation is completed, and becomes substantially same as the period T1.

A period T6 from time $t_5$ to time $t_6$ is a period for carrying out focusing and strobe flashing.

At first, a focusing operation will be described below. The CPU 10 gives the interface IC 12 instruction to increase the DC/DC converter control circuit 124 to 5V, and then, the VCC2 is kept to 5V. Subsequently, the CPU 1 gives the interface IC 12 instruction to operate the regulator 122. Whereby the VCCL is kept to 3.3V.

Next, the CPU 10 gives the AFIC 142 instruction to carry out a focusing operation. The AFIC 142 gives the line sensor array 144 instruction to make an integration of photocurrent, and integrated value is read out and outputted to the CPU 10. In the CPU 10, a subject distance is computed on the basis of the output.

Further, the period T6 includes strobe flashing. The following is a description on this strobe flashing. At first, a voltage of 5V is applied to a gate of the IGBT element 170 by the control of CPU 10, and then, the IGBT element 170 is turned on. Whereby the VCC2 is increased to 5V; therefore, a voltage of 5V can be outputted if only the CPU 10 drives by a CMOS port thereof.

Next, the trigger circuit 166 is controlled by the CPU 10, and a trigger voltage required for a start of flashing is generated, and thus, flashing is started. Then, when a required flashing is obtained, the IGBT element 170 is turned off by the CPU 10, and strobe flashing is stopped.

Since a period T7 after time $t_7$ is a waiting state after focusing and strobe flashing operations are completed, and becomes substantially same as the period T1, the details are omitted.

In the above-mentioned first embodiment, the CPU 10 may be replaced with other control elements such as CMOS logic IC.

Also, the schottky barrier diode may be replaceable with an ordinary diode.

As described in the period T5, the process carried out in the case where a voltage-up voltage partially exceeding a withstand voltage of the CPU 10 is applied to the CPU 10 is not limited to focusing and strobe charge operations.

The interface IC 12 is not always composed of one chip, but may be constructed by combining other elements. Further, the whole or part of the interface IC 12 may be constructed integrally with the CPU 10.

In the first embodiment, two supply voltages from VCCH and VCCL are supplied to the CPU 10 so as to restrict an upper limit value of a supply voltage of the VCCL. Therefore, even if a degree of integration of the inside of the CPU is increased so that the CPU is made into a small size at a low cost, it is possible to directly input and output a high voltage signal to the CPU without breaking down a high integrated section of the CPU.

Further, when the VCCL receives a supply voltage from the VCC1, the regulator 122 is operated only when the voltage exceeds the maximum operating voltage of the CPU 10. Therefore, it is possible to keep the current consumption spent when the regulator 122 is operated to the minimum.

Next, the following is a description on a second embodiment of a camera control circuit of the present invention.

The camera control circuit of the second embodiment has the same circuit construction as the first embodiment; therefore, the details are omitted.

In the second embodiment, the interface IC 12 is constructed in a manner that the built-in regulator 122 and the DC/DC converter control circuit 124 are operated together. For this reason, the DC/DC converter control circuit 124 is operated regardless of a preset voltage, and in the case of increasing the VCC2, the regulator 122 is operated together with the DC/DC converter control circuit 124.

Figure 3:
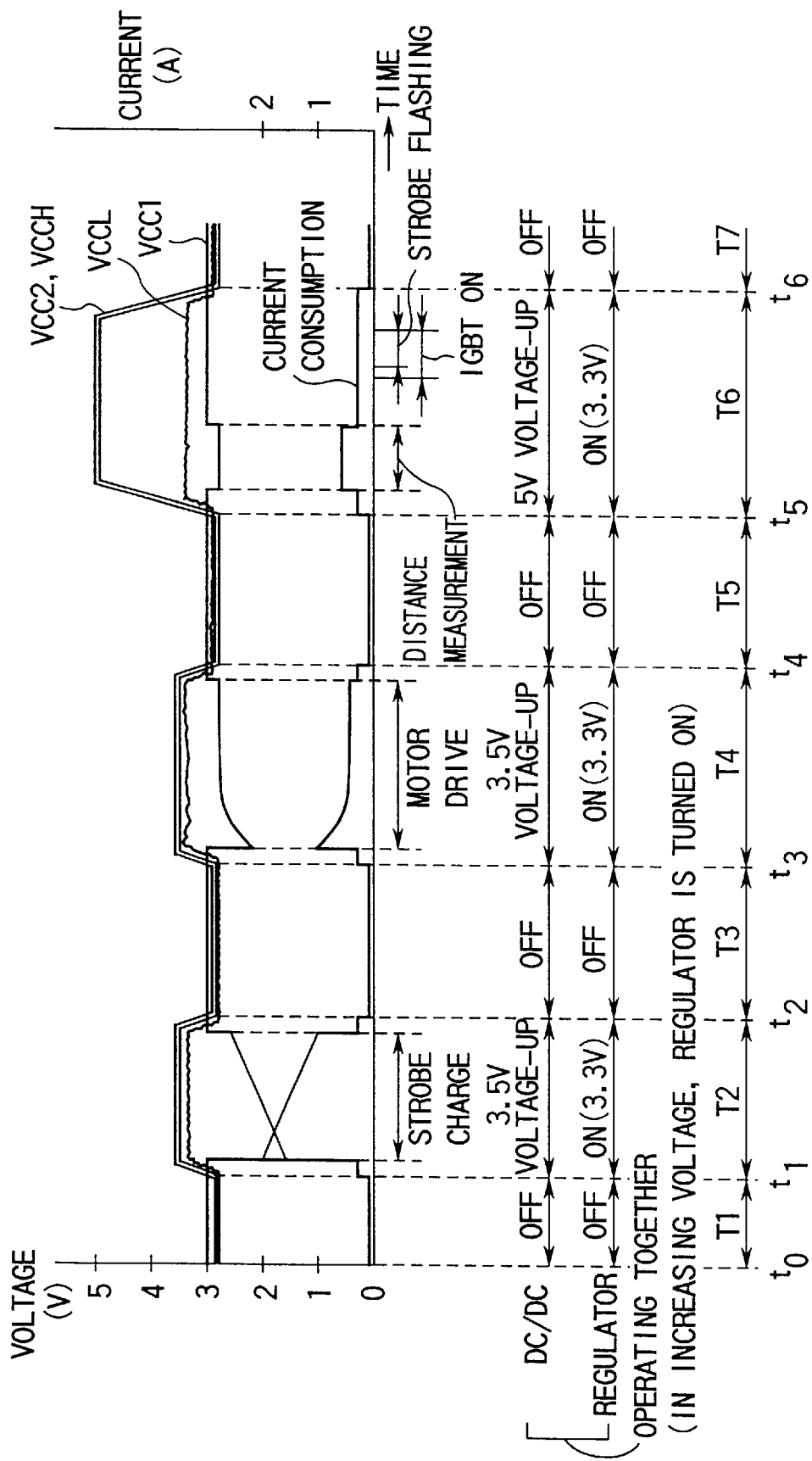
FIG. 3 is a timing chart showing a change in a supply voltage and a current consumption of the camera according to a second embodiment.

FIG. 3 is a timing chart showing a change in a supply voltage and a current consumption of the camera according to the second embodiment. The timing chart shown in FIG. 3 differs from that shown in FIG. 2 in only portion shown in the period T4. Therefore, other periods are the same as the timing chart of FIG. 2; for this reason, the details are omitted, and only period T4 will be described below.

In FIG. 3, in the period T4, the CPU 10 gives the interface IC 12 instruction to operate the DC/DC converter control circuit 124, and then, the voltage-up is started while the regulator 122 is operated. At this time, the VCCL is kept to 3.3V.

As described above, in the second embodiment, the regulator 122 and the DC/DC converter control circuit 124 are constructed so as to be operated together. Therefore, the CPU has no need to independently control the DC/DC converter control circuit 124 and the regulator 122. For this reason, it is possible to reduce a program load of CPU and use a small-size and low cost CPU. Further, it is possible to previously prevent an accident of breaking down a low withstand voltage section of CPU due to a program miss of designer.

Next, the following is a description of a third embodiment of a camera control circuit of the present invention.

Figure 4:
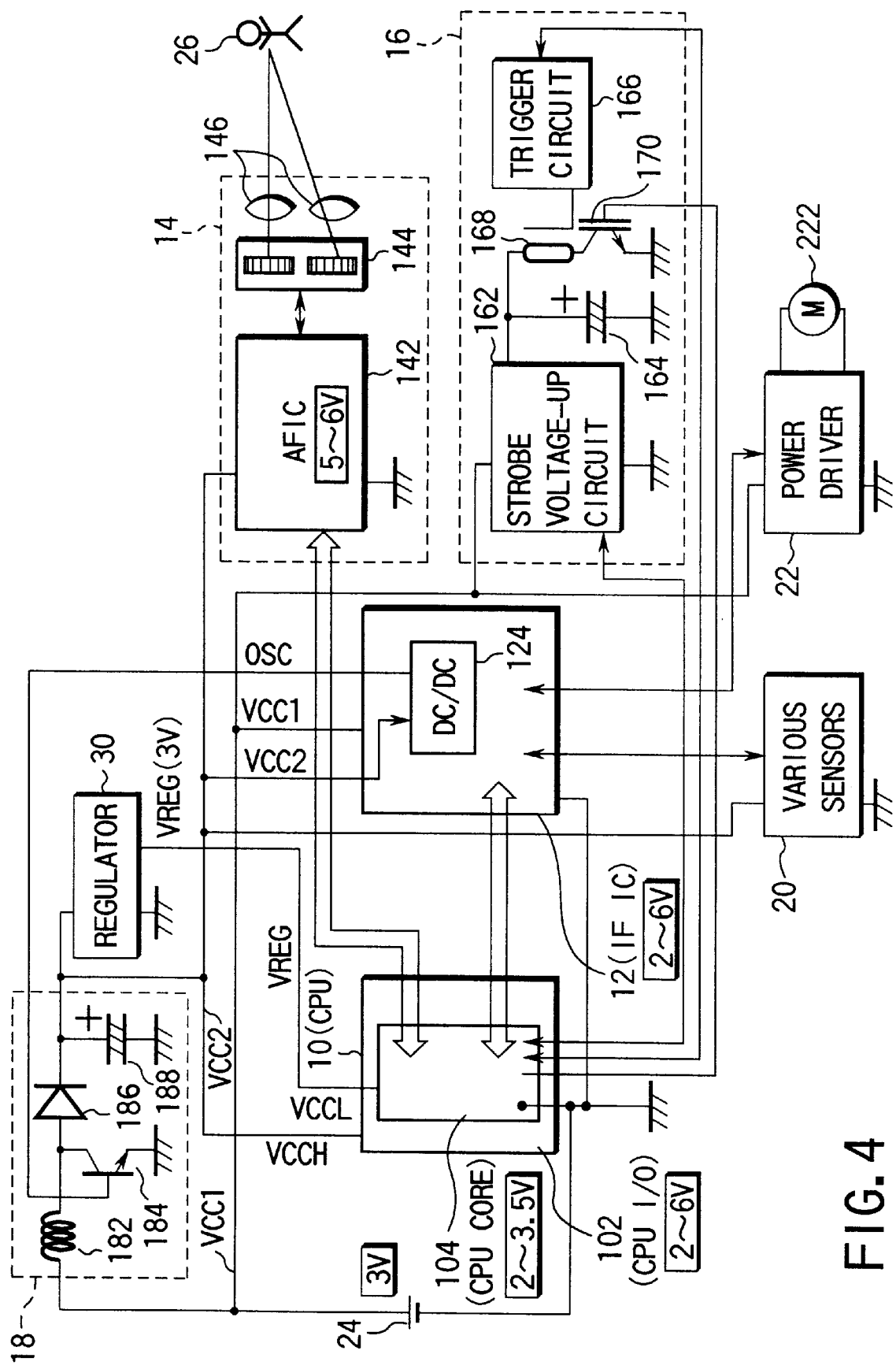
FIG. 4 is a block diagram showing a construction of a camera control circuit according to a third embodiment of the present invention.

FIG. 4 is a diagram showing a construction of a camera control circuit according to the third embodiment of the present invention.

The camera control circuit of the third embodiment has almost the same construction as the first embodiment except the interface IC 12.

More specifically, as shown in FIG. 4, no regulator is provided in the interface IC 12, and an another regulator 30 is interposed between the CPU 10 and the voltage-up circuit 18. The regulator 30 is a CMOS structure and low power consumption type, and is always operated. The supply is supplied from the VCC2.

When the VCC2 is less than 3V, the regulator 30 outputs a voltage slightly lower than the VCC2. In a waiting state, the VCC2 is about 2.8V; on the other hand, the VCCL becomes about 2.7V, although which depends upon a current consumption of the CPU core 104. Also, even if the VCC2 is increased to 3.5V or 5V, the VCCL is kept to 3V.

In this third embodiment constructed as described above, since the regulator is always operated, the CPU has no need to control the regulator. Therefore, it is possible to reduce a program load of CPU and use a small-size and low cost CPU. Further, it is possible to previously prevent an accident of breaking down a low withstand voltage section of CPU by a program miss of a designer.

As described above, according to the present invention, in a voltage exceeding the maximum operating voltage of a part of control circuit, even if a supply voltage supplied to the control circuit is increased, it is possible to obtain a camera control circuit which is driven by a low current consumption without breaking down a part of control circuit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as. defined by the appended claims and their equivalents.

What is claimed is:

1. A camera control circuit comprising:

a control circuit which outputs a control instruction so as to control peripheral circuits, said control circuit including a first function block capable of operating in a predetermined supply voltage range and a second function block, having a computation function, capable of operating in a predetermined supply voltage range having an upper limit value lower than the first function block;

a voltage-up circuit which increases a supply voltage of a battery in a supply voltage range enabling the first function block to operate so as to set a first supply voltage based on the control instruction, and which supplies the first supply voltage to the first function block; and a voltage-down circuit which decreases the first supply voltage in a supply voltage range enabling the second function block to operate so as to set a second supply voltage based on the control instruction, and which supplies the second supply voltage to the second function block.

2. The camera control circuit according to claim 1, further comprising a strobe circuit for carrying out a strobe operation, and wherein the control circuit controls the voltage-up circuit and the voltage-down circuit at least at a time of the strobe operation by the strobe circuit.

3. The camera control circuit according to claim 1, further comprising a distance measurement circuit for carrying out a distance measurement operation, and wherein the control circuit controls the voltage-up circuit and the voltage-down circuit at least at a time of the distance measurement operation by the distance measurement circuit.

4. The camera control circuit according to claim 1, further comprising a strobe circuit for carrying out a strobe operation, and a distance measurement circuit for carrying out a distance measurement operation, and wherein the control circuit controls the voltage-up circuit and the voltage-down circuit at least at a time of the strobe operation by the strobe circuit and at a time of the distance measurement operation by the distance measurement circuit.

5. The camera control circuit according to claim 2, wherein the strobe operation comprises at least one of a strobe charge and a strobe flashing.

6. The camera control circuit according to claim 1, wherein the control circuit independently controls the voltage-up circuit and the voltage-down circuit.

7. The camera control circuit according to claim 2, wherein the control circuit independently controls the voltage-up circuit and the voltage-down circuit.

8. The camera control circuit according to claim 3, wherein the control circuit independently controls the voltage-up circuit and the voltage-down circuit.

9. The camera control circuit according to claim 1, wherein the control circuit controls the voltage-up circuit and the voltage-down circuit so that they are operated together.

10. The camera control circuit according to claim 2, wherein the control circuit controls the voltage-up circuit and the voltage-down circuit so that they are operated together.

11. The camera control circuit according to claim 3, wherein the control circuit controls the voltage-up circuit and the voltage-down circuit so that they are operated together.

12. The camera control circuit according to claim 1, wherein the control circuit is operated when the first supply voltage value is more than an upper limit value of the range enabling the second function block to operate.

13. The camera control circuit according to claim 2, wherein the control circuit directly drives and controls a gate drive type switching element included in the strobe circuit.

14. The camera control circuit according to claim 1, wherein the control circuit directly drives and controls a focusing element included in a focusing circuit.

15. The camera control circuit according to claim 13, further comprising a rectifying element interposed between the battery and the second function block.

16. A camera control circuit comprising:

a control circuit which outputs a control instruction so as to control peripheral circuits, said control circuit including a first function block capable of operating in a predetermined supply voltage range and a second function block, having a computation function, capable of operating in a predetermined supply voltage range having an upper limit value lower than the first function block;

a voltage-up circuit which increases a supply voltage of a battery in a supply voltage range enabling the first function block to operate so as to set a first supply voltage based on the control instruction, and which supplies the first supply voltage to the first function block; and a voltage-down circuit which decreases the first supply voltage in a supply voltage range enabling the second function block to operate so as to set a second supply voltage regardless of the control instruction, and which supplies the second supply voltage to the second function block.

17. A camera control circuit comprising:

a control circuit comprising a one-chip microcomputer which outputs a control instruction so as to control peripheral circuits, said one-chip microcomputer including a first function block capable of operating in a predetermined supply voltage range and a second function block capable of operating in a predetermined supply voltage range having an upper limit value lower than the first function block, said first function block comprising a signal input/output section, and said second function block comprising a computation function section;

a voltage-up circuit which increases a supply voltage of a battery in a supply voltage range enabling the first function block to operate so as to set a first supply voltage based on the control instruction, and which supplies the first supply voltage to the first function block; and a voltage-down circuit which decreases the first supply voltage in a supply voltage range enabling the second function block to operate so as to set a second supply voltage based on the control instruction, and and which supplies the second supply voltage to the second function block; and wherein the first supply voltage is higher than the upper limit value of the predetermined supply voltage range of the second function block.

18. A camera control circuit comprising:

a control circuit comprising a one-chip microcomputer which outputs a control instruction so as to control peripheral circuits, said one-chip microcomputer including an input/output section which is capable of operating in a predetermined supply voltage range and which carries out an electric signal exchange with peripheral circuits, and including a computation control section which is capable of operating in a predetermined supply voltage range having an upper limit value lower than the input/output section;

a voltage-up circuit which increases a supply voltage of a battery in a supply voltage range enabling the input/output section to operate so as to set a first supply voltage based on the control instruction, and which supplies the first supply voltage to the input/output section;

a voltage-down circuit which decreases the first supply voltage in a supply voltage range enabling the computer control section to operate so as to set a second supply voltage based on the control instruction, and which supplies the second supply voltage to the computation control section;

a strobe circuit having a gate drive type switching element which is directly driven and controlled by the control circuit, said strobe circuit being provided for carrying out a strobe charge operation and a strobe flashing operation; and a distance measurement circuit having a distance measurement element which is directly driven and controlled by the control circuit;

wherein the control circuit controls the voltage-up circuit and the voltage-down circuit at least at one of a time of the strobe operation by the strobe operation and a time of the distance measurement operation by the distance measurement circuit; and wherein the first supply voltage is higher than the upper limit value of the predetermined supply voltage range of the computation control section, and the second supply voltage is lower than the upper limit value of the predetermined supply voltage range of the computation control section.

19. The camera control circuit according to claim 18, further comprising a motor drive circuit for driving a motor, and wherein the control circuit controls the voltage-up circuit and the voltage-down circuit at the time of the strobe operation by the strobe circuit, at the time of the distance measurement operation by the distance measurement circuit, and at a time of the motor driving operation by the motor drive circuit.

* * * * *